C. HAMMARSTROM.
AUTOMOBILE FENDER.
APPLICATION FILED AUG. 15, 1913.

1,091,331. Patented Mar. 24, 1914.

Witnesses

Inventor
Carl Hammarstrom
By Victor J. Evans
Attorney

UNITED STATES PATENT OFFICE.

CARL HAMMARSTROM, OF MONESSEN, PENNSYLVANIA, ASSIGNOR OF ONE-HALF TO GUSTAF NEWMAN, OF MONESSEN, PENNSYLVANIA.

AUTOMOBILE-FENDER.

1,091,331.  Specification of Letters Patent.  Patented Mar. 24, 1914.

Application filed August 15, 1913. Serial No. 784,919.

*To all whom it may concern:*

Be it known that I, CARL HAMMARSTROM, a citizen of the United States, residing at Monessen, in the county of Westmoreland and State of Pennsylvania, have invented new and useful Improvements in Automobile-Fenders, of which the following is a specification.

The invention relates to fenders, and more particularly to the class of automobile fenders.

The primary object of the invention is the provision of a fender of this character wherein persons or objects struck by the machine when in motion will be prevented from falling beneath the wheels or being forcibly struck with any of the projecting parts of the automobile, thereby obviating the possibility of maiming the person or causing the loss of life by running over such person.

Another object of the invention is the provision of a fender wherein the front wheels of the motor vehicle are guarded so that it will be impossible for a person or object to fall beneath the wheels and thereby sustain injury.

A further object of the invention is the provision of a fender of this character which can be readily attached to or removed from the motor vehicle.

A still further object of the invention is the provision of a fender of this character which is simple in construction, strong, durable, thoroughly reliable and efficient in its purpose, and inexpensive in manufacture.

With these and other objects in view, the invention consists in the construction, combination and arrangement of parts as will be hereinafter fully described, illustrated in the accompanying drawing, and pointed out in the claim hereunto appended.

Figure 1:
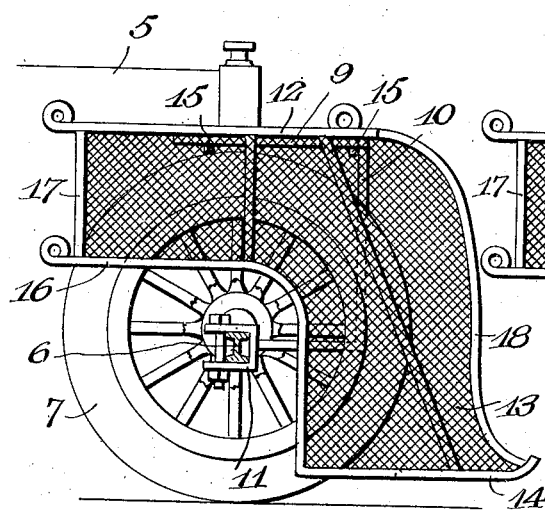
Figure 4:
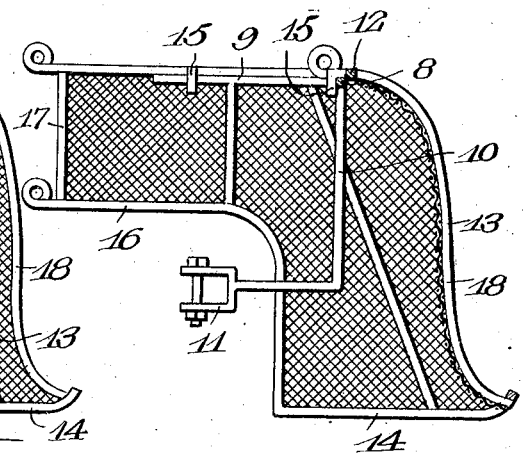
Figure 2:
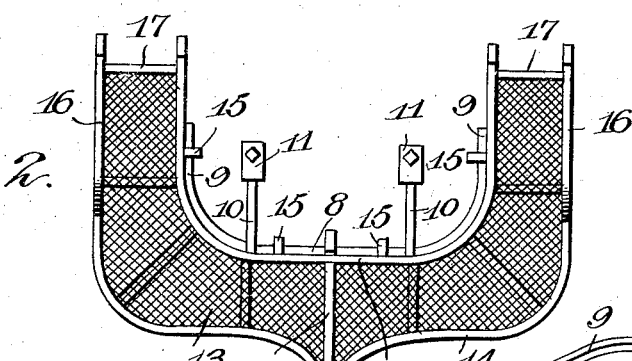
Figure 5:
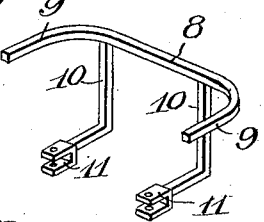
Figure 3:
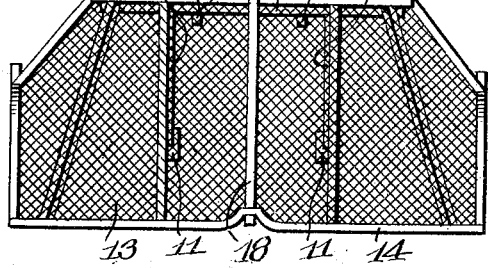

In the drawing:—Figure 1 is a fragmentary side elevation of a motor vehicle with one of its front wheels partly broken away and the axle in section and showing the fender constructed in accordance with the invention applied. Fig. 2 is a top plan view of the fender. Fig. 3 is a front elevation thereof. Fig. 4 is a vertical transverse sectional view through the fender. Fig. 5 is a perspective view of the fender support.

Similar reference characters indicate corresponding parts throughout the several views in the drawing.

Referring to the drawing by numerals, 5 designates generally a portion of the body of an automobile, 6 the front axle, and 7 the front turning wheel supported upon the usual spindle connected by means of a turning knuckle of the ordinary well-known type to the said front axle.

Detachably mounted upon the front axle 6 is a fender support comprising a substantially U-shaped hanger rail 8 having its end portion disposed rearwardly for a distance at opposite sides of the front portion of the automobile and supported at the desired elevation forwardly of the automobile body upon L-shaped brackets or hangers 10 which are provided at their free ends with axle clips 11 adapted to embrace the front axle 6 for the detachable mounting thereof.

The fender comprises a substantially scoop shaped structure including an upper frame 12 of a shape corresponding to the U-shaped rail of the fender support, and a lower frame 14 which is of greater size than the upper frame 12. On these frames 12 and 14 is mounted a wire mesh fabric netting 13 forming the body of the said fender. The lower frame 14 has its side limbs bent upwardly and rearwardly as at 16 so that the netting connected thereto and to the end portions 9 of the upper frame 12 will serve as wheel shields or guards disposed outside of the wheels 7 to prevent a person or object from falling beneath the same when the automobile is in motion. The upper frame 12 is formed at intervals with hooks 15 which detachably engage the U-shaped hanger rail 8 for the suspension of the fender at the forward end of the automobile.

Connected to the upper and lower frames 12 and 14 are spaced braces 17 which are disposed against the inner side of the netting 13, the braces 17 being integral with the frame and preventing the sagging of the netting when pressure is applied thereto, while integrally formed with the frames centrally thereof is a reversely curved upright rib 18, the same being disposed on the outer side of the netting to reinforce the fender structure at this point.

From the foregoing it is thought that the construction and manner of use of the invention will be clearly understood, and therefore a more extended explanation has been omitted.

What is claimed is:—

The combination with a fender body having a substantially U-shaped top rail, of a support comprising an L-shaped arm, an axle clip on one end of the arm, a substantially U-shaped rail on the other end of the arm, and hooks at intervals on the top rail of the fender body and detachably engageable with the other rail.

In testimony whereof I affix my signature in presence of two witnesses.

CARL HAMMARSTROM.

Witnesses:
GUSTAF E. NEWMAN,
J. E. NEWCOMER.

Copies of this patent may be obtained for five cents each, by addressing the "Commissioner of Patents, Washington, D. C."